United States Patent [19]

Groen

[11] Patent Number: 4,834,635
[45] Date of Patent: May 30, 1989

[54] EXTRUSION DIE FOR EXTRUDED PRODUCT

[75] Inventor: John W. Groen, Hagley, England

[73] Assignee: Cadbury Limited, Birmingham, United Kingdom

[21] Appl. No.: 239,079

[22] Filed: Sep. 1, 1988

Related U.S. Application Data

[63] Continuation of Ser. No. 10,721, Feb. 4, 1987, abandoned.

[30] Foreign Application Priority Data

Feb. 6, 1986 [GB] United Kingdom ............... 8602950

[51] Int. Cl.$^4$ ............................................. B29C 47/12
[52] U.S. Cl. ................................... 425/72.1; 99/466; 264/177.16; 264/177.2; 264/209.2; 425/465; 425/467; 426/516
[58] Field of Search ............... 425/131.1, 133.1, 465, 425/467, 468, 380, 381, 382.3, 532, 72.1, 326.1, 387.1; 264/177.2, 177.16, 177.17, 209.1, 209.2, 209.8, 572; 426/512, 514, 516, 517; 99/516, 466, 450.7

[56] References Cited

U.S. PATENT DOCUMENTS

| | | | |
|---|---|---|---|
| 1,492,600 | 5/1924 | Laskey | 426/514 |
| 1,649,308 | 11/1927 | Hunter | 425/133.1 |
| 2,682,081 | 6/1954 | Fisch | 425/467 X |
| 2,763,029 | 9/1956 | Tullos, Jr. | 264/564 |
| 3,281,897 | 11/1966 | Mercer | 425/380 |
| 3,402,682 | 9/1968 | Peden et al. | 425/465 |
| 3,485,912 | 12/1969 | Schrenk et al. | 264/177.17 X |
| 3,778,217 | 12/1973 | Bustamante et al. | 425/467 |
| 3,857,963 | 12/1974 | Graff et al. | 426/3 |
| 4,061,461 | 12/1977 | Hessenthaler | 425/467 X |
| 4,138,503 | 2/1979 | Ziolko | 426/514 |
| 4,229,154 | 10/1980 | Chaban, Jr. et al. | 425/467 X |
| 4,321,228 | 3/1982 | de Kok | 264/177.16 X |
| 4,409,154 | 10/1983 | Grenat | 425/133.1 X |
| 4,468,185 | 8/1984 | Jansen | 426/512 X |
| 4,563,358 | 1/1986 | Mercer et al. | 426/516 X |

FOREIGN PATENT DOCUMENTS

| | | |
|---|---|---|
| 0153687 | 2/1985 | European Pat. Off. . |
| 87300889 | 6/1988 | European Pat. Off. . |
| 1310390 | 6/1958 | Fed. Rep. of Germany . |
| 1577201 | 10/1957 | France . |
| 2302847 | 7/1975 | France . |
| 27700 | of 1911 | United Kingdom . |
| 183337 | 7/1922 | United Kingdom . |
| 549427 | 11/1942 | United Kingdom . |
| 629207 | 7/1949 | United Kingdom . |
| 756045 | 8/1956 | United Kingdom . |
| 836555 | 6/1960 | United Kingdom . |
| 861447 | 2/1961 | United Kingdom . |
| 925657 | 5/1963 | United Kingdom . |
| 925658 | 5/1963 | United Kingdom . |
| 1130598 | 10/1968 | United Kingdom . |
| 1185062 | 3/1970 | United Kingdom . |
| 1360868 | 7/1974 | United Kingdom . |
| 1495879 | 12/1977 | United Kingdom ................ 425/467 |

Primary Examiner—Richard L. Chiesa
Attorney, Agent, or Firm—Holman & Stern

[57] ABSTRACT

An extrusion die for producing hollow extrusions from material which is difficult to solidify quickly, e.g. chocolate, the die comprising an outer die part secured to the end of a supply pipe, a central aperture in the outer die part within which an inner die part having a multiplicity of spaced air injectors is provided, so that during extrusion chocolate forced through the apertures surrounds the injectors to produce an extrusion product having a plurality of longitudinal passages therein. A fluid, e.g. air, is passed through the injectors and into the longitudinal passages to prevent collapse of the passages before the chocolate has set. Relative rotation between the outer and inner die parts may be effected.

6 Claims, 4 Drawing Sheets

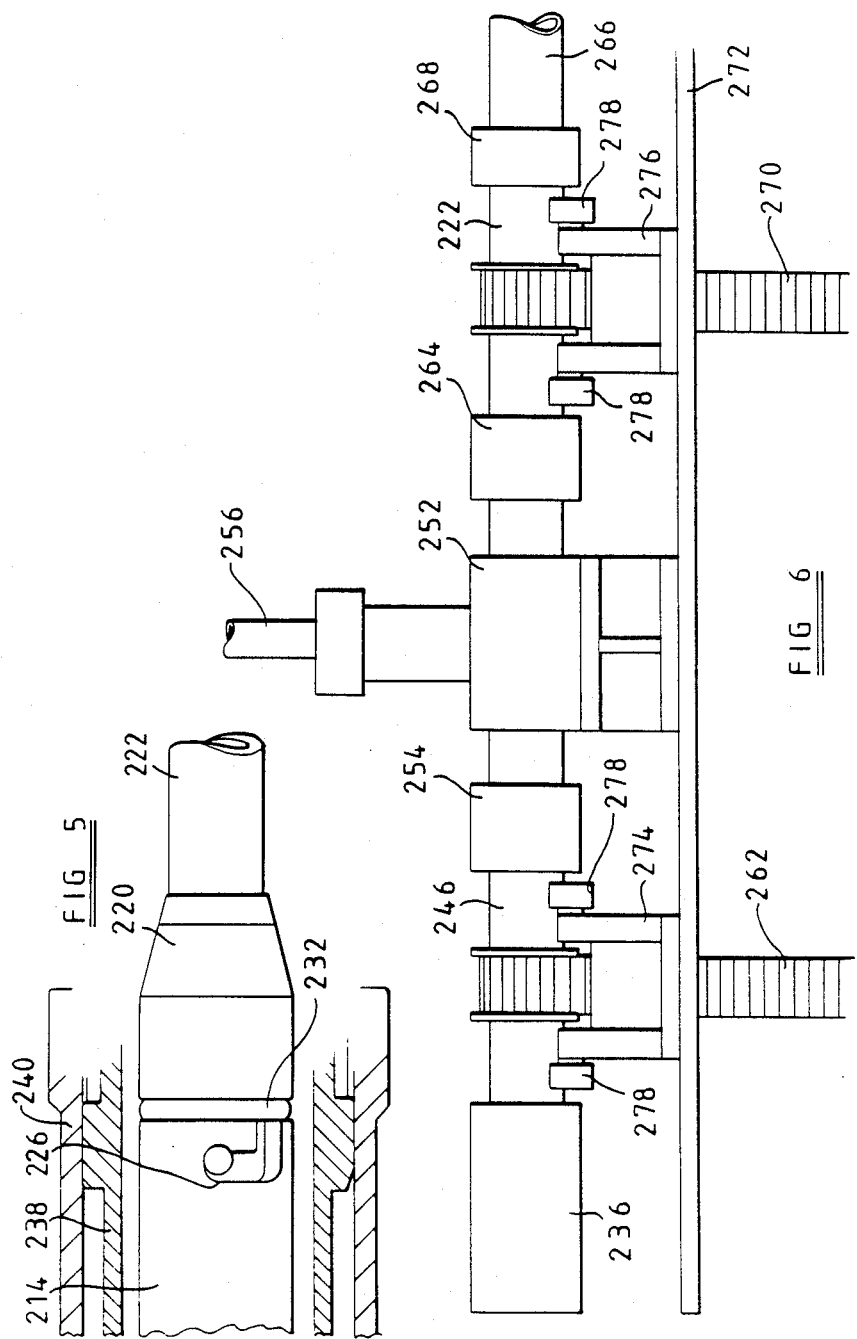

EXTRUSION DIE FOR EXTRUDED PRODUCT

This is a continuation of application Ser. No. 010,721, filed Feb. 4, 1987, and now abandoned.

BACKGROUND OF THE INVENTION

1. Field of the Invention

The present invention relates to a die for the extrusion of hollow shapes and a method of forming an extended product, and more particularly though not exclusively, is concerned with such a die for the extrusion of materials which are difficult to solidify quickly, e.g. edible compositions such as chocolate.

2. Description of the Prior Art

We have found that the continuous extrusion of a hollow section of chocolate suffers from the problem that air can only enter the section from the downstream end of the section. When the section becomes long relative to the diameter of the hollow part, it becomes difficult for enough air to enter the section to equalize the pressure on the inside and the outside of the section. Consequently, a partial vacuum can form and if the extruded chocolate has not fully solidified, the section can collapse.

The problem is further increased if the extruded section is transversely cut after it has solidifed as the cutting blade blocks the new downstream end when the cut is first made and so prevents any air entering the section, thus causing a greater pressure difference.

BRIEF SUMMARY OF THE INVENTION

It is an object of the present invention to obviate or mitigate the problem outlined above.

According to the present invention there is provided an extrusion die comprising an outer die part having an aperture therein and an inner die part located within said aperture so as to define an extrusion orifice which completely surrounds said inner die part to enable a product having at least one passage therethrough to be extruded, the inner die part having at least one fluid outlet therein to provide fluid to the at least one passage in the extruded product.

Preferably, the inner die part has a plurality of fluid outlets, each corresponding to a hollow passage in the extruded product.

According to the present invention, there is also provided a methiod of forming an extruded product comprising extruding an extrudable material through a die to form a product having at least one passage therein while passing a fluid into the passage to prevent the walls thereof from collapsing after extrusion and before setting of the material.

Preferably, the material is chocolate which preferably has a clay-like consistency which is conveniently achieved by tempering the chocolate under elevated pressure while stirring.

Preferably, the fluid is a gas, typically air, but in principle a liquid or paste can also be used.

The inner and outer die parts may be fixed against relative rotation. However, it has been found that the appearance of the product can be enhanced by rotating either or both of the inner and outer die parts in either direction simultaneously or in opposite directions simultaneously, or by varying the direction of rotation, i.e. oscillation. In the case of a die where there is no relative rotation between the inner and outer parts thereof, the product can build up in the die and cause the product to be extruded at different rates across the die. This results in the product tending to swerve to one side when extruded. Relative rotation described above reduces the possibility of product building up, due to the mixing action. Secondly, depending on the speed of relative rotation, if there is a tendency for the product to swerve to one side, the direction will continuously vary. If the speed of relative rotation is adjusted to be relatively high compared to the extrusion speed, the swerving can be reduced to a tolerable amount.

It has been found that any foreign matter contained in the material which is being extruded will tend to block the spaces in the die. The die then has to be dismantled for cleaning. This operation is considerably simplified by providing a quick-release mechanism. Thus, in a preferred embodiment, the outer die part is provided at one end of a sleeve whose opposite end is detachably engaged by a supply pipe for extrudable material, and the inner die part is provided at one end of a support which extends axially into the sleeve through the other end of the latter. Detachment of the sleeve from the supply pipe exposes the inner die part and the support for cleaning purposes.

Preferably, the support is detachably engaged, e.g. by a bayonet connection, with a fluid supply pipe.

BRIEF DESCRIPTION OF THE DRAWINGS

The present invention will now be described, by way of example, with reference to the accompanying drawings wherein:

FIG. 5 is an axial cross-sectional view through part of the die of FIG. 4 showing an internal detail of the die; and FIG. 6 is a schematic side elevation showing how the die of FIGS. 4 and 5 can be rotatably mounted.

DETAILED DESCRIPTION

Figure 1:
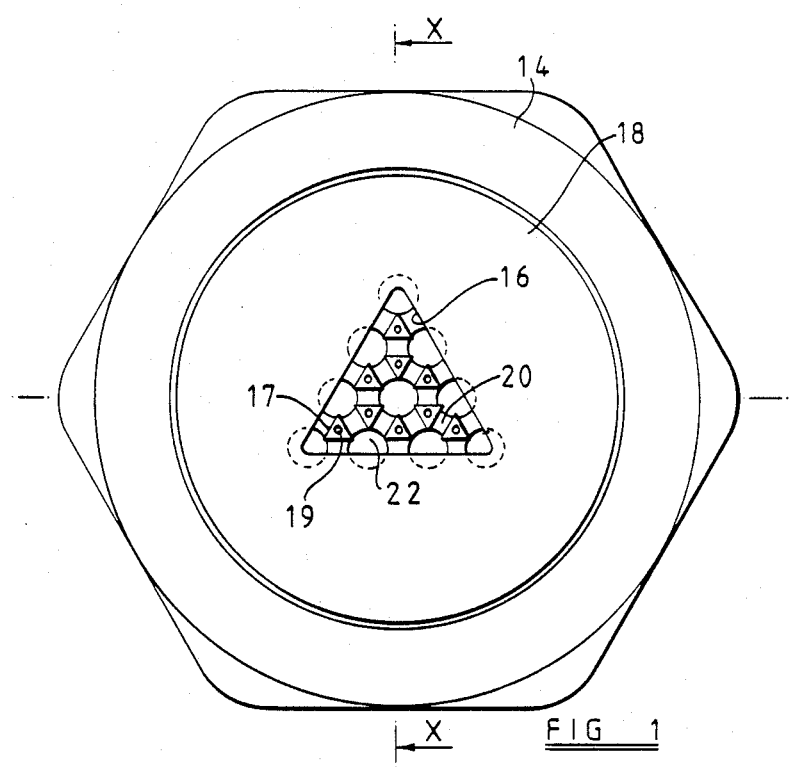
FIG. 1 is an end elevational view of a die according to one embodiment of the present invention
Figure 2:
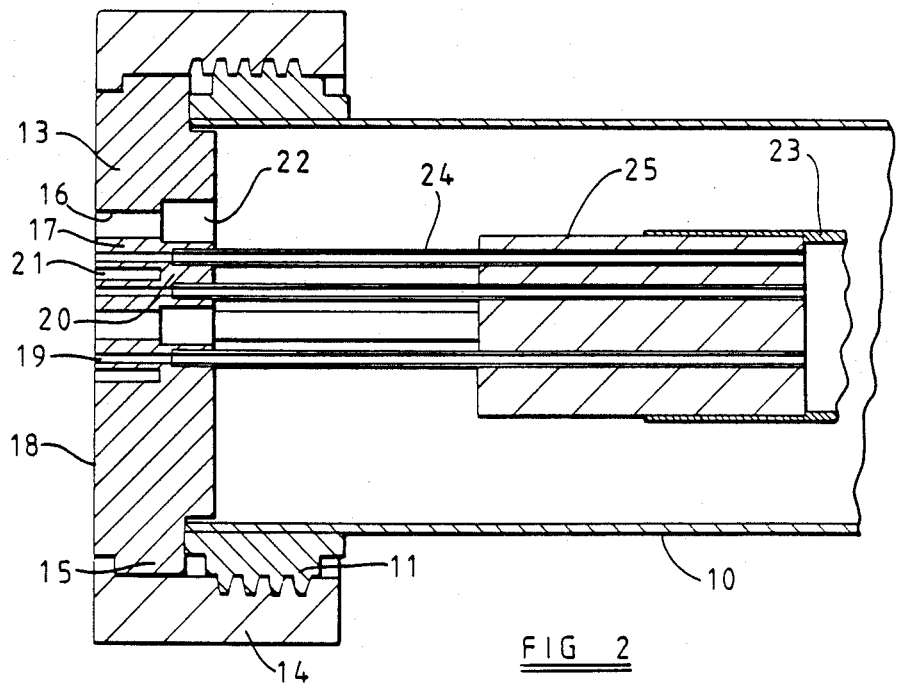
FIG. 2 is a cross-sectional side view taken along the line X—X of FIG. 1.
Figure 3:
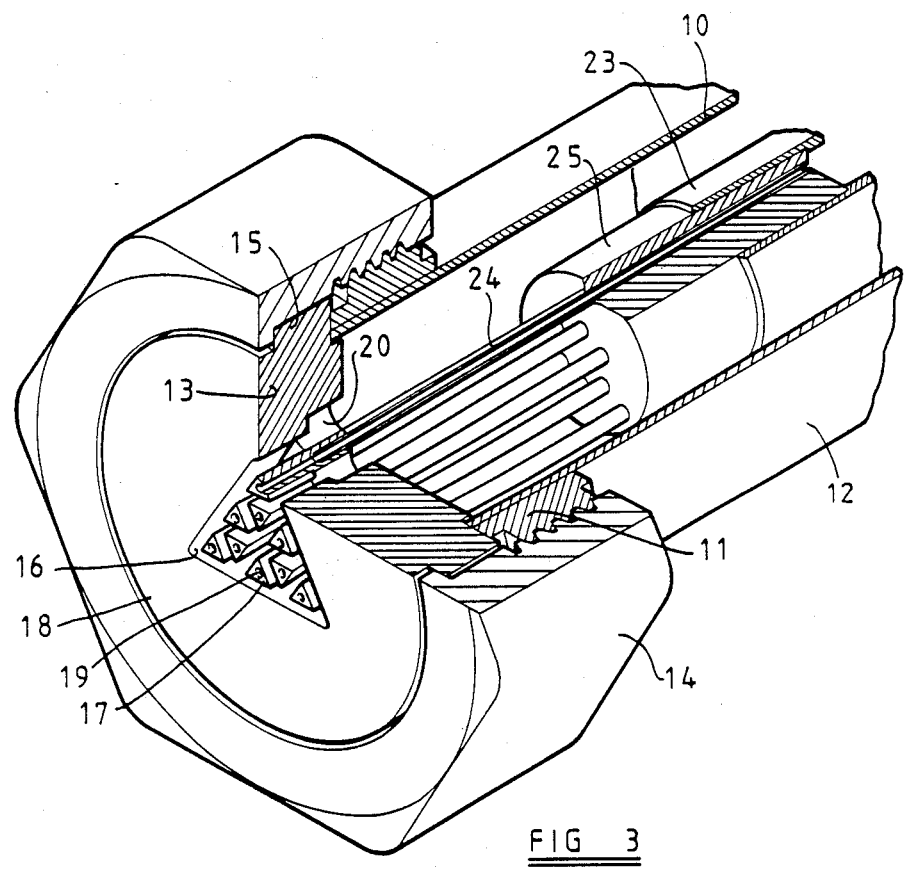
FIG. 3 is a perspective view of the embodiment of FIG. 1 shown partly in cross-section.

The die shown in the drawings is suitable for use with an extrudable confection, especially chocolate. The arrangement of FIGS. 1 to 3 comprises a supply pipe 10 having a threaded collar 11 fixed around the outer surface 12 of one end thereof and having the other end connected to a pressurized supply of an edible composition (not shown).

An outer die part 13 is held sealed against the end of the pipe 10 by means of an annular collar 14 which engages a flange 15 around the periphery of the die part 13 and which also engages the threaded collar 11.

The die part 13 has a a central aperture 16. In the present case, the shape of the aperture 16 is generally triangular with rounded corners although it will be appreciated that other shapes e.g. square, circle etc. could be used. A plurality of fluid injectors 17 (in the present case nine) forming part of an inner die part are located within the aperture 16 and can, but not necessarily, terminate level with the downstream surface 18 of the die part 13. In the present case, the injectors are of triangular cross-section and each has an axially extending circular bore 19 provided therethrough. However, the number and cross-sectional shape of the injectors 17 can be selected according to the desired cross-sectional shape of the hollow passage or passages to be formed in the extruded member.

The aperture and injector arrangement described above extrudes a member of generally triangular cross-section having nine triangular passages therein and continuous, i.e. imperforate, outer peripheral walls.

The injectors 17 are interconnected by means of webs 20 which also connect the injectors to the outer die part 13 and which terminate short of the outer surface 18 such that clearly-defined spaces 21 are provided between the injectors 17 and the die part 13, and the injectors are spaced apart about a core-forming space. Holes 22 are provided between the webs 20 to allow passage of the extruded material from the pipe 10 into the aperture 16 via the holes 22, the confection filling the spaces 21 beyond the webs 20 to enclose each injector completely before being extruded from the aperture 16. At the same time, fluid, typically air is supplied at a constant rate through the tube 23 under pressure and passes through a manifold 25, spaced pipes 24 and bores 19 in injectors 17 into the passages formed by the injectors in the extruded body. This prevents the formation of regions of low pressure within the extruded member which may cause it to collapse before it solidifies fully.

The provision of extruded material between the injectors 17 is ensured by virtue of the fact that the tube 23 and manifold 25 terminate short of the outer die part 13 and so the extrudible material can flow between pipes 24 and thereafter equally through all of the holes 22.

Although this arrangement is intended for use with extrudable chocolate, it will be clear that it may be used for similar applications with other extrudible materials which solidify relatively slowly and are therefore not susceptible to being extruded vertically or wound on a drum after solidification.

In a particular example, the arrangement described above is supplied with chocolate which has been tempered to an extrudable clay-like consistency as described in our copending British Patent Application No. 8602946 entitled "Method of Tempering Edible Compositions".

In this case, chocolate is tempered to a clay-like consistency and is then pumped to the die described above. As the chocolate is extruded, air is supplied to the injectors at a pressure and flow rate necessary to prevent collapse of the hollow chocolate member. The chocolate hollow member is extruded horizontally onto a moving conveyor belt where it rapidly sets with minimal cooling. The extruded chocolate member is then transversely cut to the required lengths.

Figure 4:
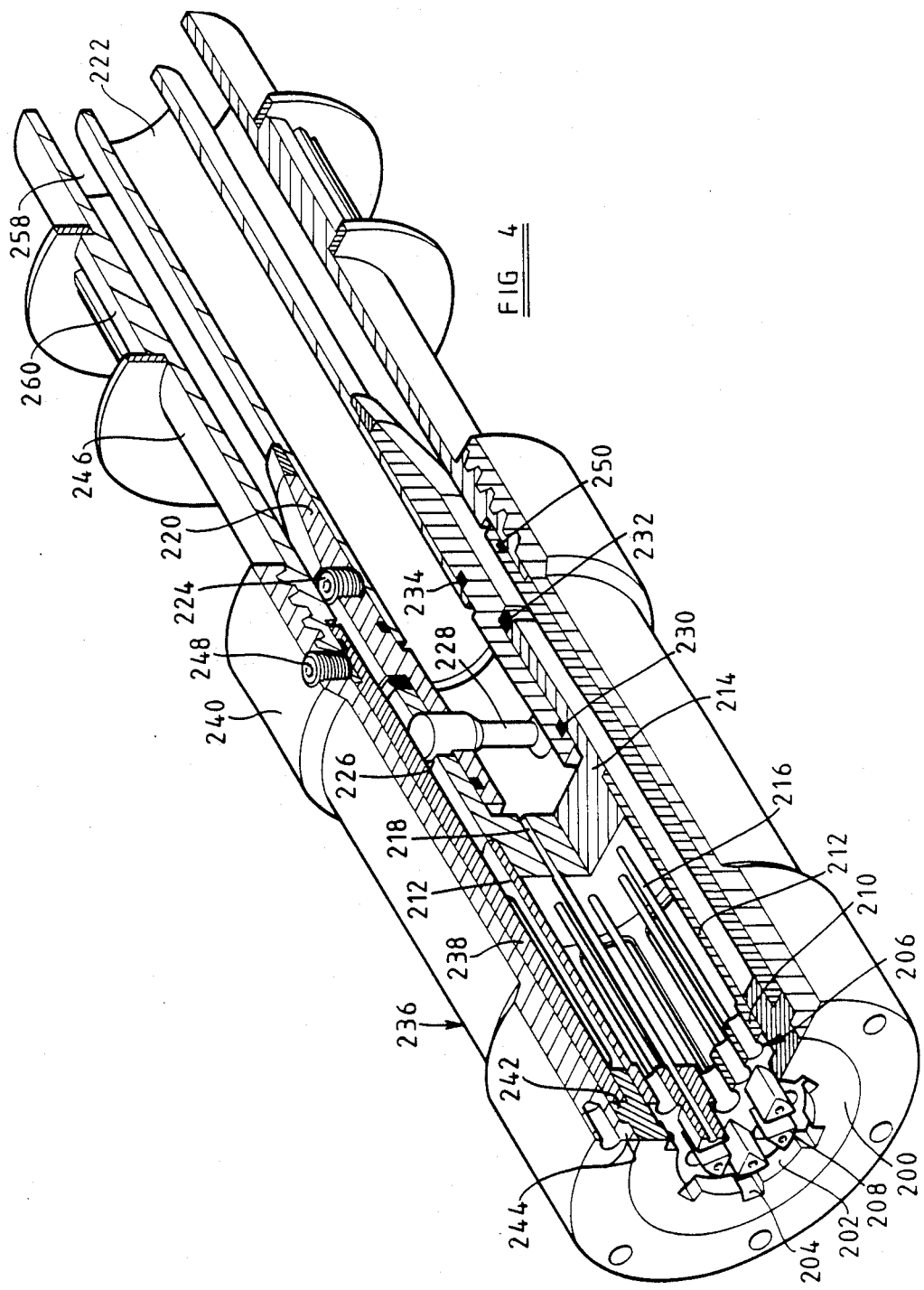
FIG. 4 is a view similar to FIG. 3 of an extrusion die according to another embodiment of the present invention.

Referring now to FIGS. 4 to 6 of the drawings, the extrusion die illustrated therein is for the extrusion of chocolate having a clay-like consistency. The die comprises an outer die part 200 having a central aperture 202 therein. The aperture 202 is circular with a series of outwardly extending recesses 204 equi-spaced around its periphery. The die further includes an inner die part 206 including a multiplicity of spaced apart injectors 208 which are disposed within aperture 202. The injectors 208 are of segmental shape with their inner peripheries arranged on a pitch circle centered on the axis of the aperture 202 so that they are spaced apart about a core-forming space. The injectors 208 extend laterally from one side of an apertured support plate 210. The support plate 210 is formed at one end of a cylindrical cage 212. The outer periphery of the support plate 210 is circular and serves as a bearing surface for the outer die part 200 which is an accurate sliding fit thereover so that relative rotation between the support plate 210 and the outer die part 200 is permitted, with the respective mating surfaces thereof being sufficiently close to provide an effective seal against passage of extrudable material therebetween. The support cage 212 is firmly secured to a manifold 214. Pipes 216 extend in spaced apart relationship between the manifold 214 and the support plate 210 and serve to connect bores 218 in the manifold with respective injectors 208. The manifold 214 is mounted on one end of a collar 220 whose other end is secured to an air supply pipe 222 by means of grub screw 224. The manifold 214 has bayonet slots 226 therein (see particularly FIG. 5) which are engageable in bayonet fashion with the exposed ends of a pin 228 which passes diametrically through the collar 220. O-ring seals 230 and 232 are provided to seal the joint between the manifold 214 and the collar 220. A further O-ring seal 234 is provided to seal the joint between the collar 220 and the air supply pipe 222. The interior of the pipe 222 communicates with the bores 218 in the manifold 214 so that air supplied through pipe 222 is fed via pipes 216 to all of the injectors 208. The outer die part 200 is carried at one end of a composite support sleeve 236. The composite sleeve 236 is defined by inner and outer sleeve portions 238 and 240 respectively. The inner sleeve portion 238 terminates at each end inwardly of the respective end of the outer sleeve portion 240 and is fixed relative thereto. The outer die part 200 has an upstream end which engages within the adjacent end of the inner sleeve portion 238 and is also provided with an outwardly directed flange 242 which abuts an inwardly directed rib 244 at the end of the outer sleeve portion 240. The outer die part 200 is held in this position by the inner sleeve portion 238. Thus, the outer die part 200 is securely fastened in a detachable way within one end of the sleeve 236. At the opposite end of the sleeve 236, the outer sleeve portion 240 is internally screw-threaded for engagement with external screw-threading on a supply pipe 246. A grub screw 248 serves to lock the outer sleeve portion 240 relative to the pipe 246. The end of the inner sleeve portion 240 adjacent the supply pipe 246 is stepped and extends into the end of the supply pipe 246, the latter being correspondingly stepped. An O-ring seal 250 serves to seal the inner sleeve portion 238 relative to the supply pipe 246. The supply pipe 246 is connected with a manifold 252 via a rotary seal 254 (see FIG. 6). The manifold 252 serves to supply chocolate having a clay-like consistency under pressure from a pipe 256 to the annular space 258 defined between the pipes 246 and 222. Between the rotary seal 254 and the sleeve 236, the pipe 246 is provided with a toothed pulley 260 which is connected with a motor via a toothed belt 262 (see FIG. 6). The air supply pipe 222 passes through the manifold 252 and through a rotary seal 264 to be connected with an air supply hose 266 via a further rotary seal 268. Between the rotary seals 264 and 268, the air supply pipe 222 is provided on its outer periphery with a toothed pulley driven from a motor via a toothed belt 270.

The whole assembly is carried on a fixed table 272 which is fitted with stands 274 and 276. Each stand 274, 276 mounts two pairs of freely rotatable rubber-rimmed wheels 278. The wheels 278 associated with the stand 274 engage against and support the pipe 246, and the wheels 278 associated with the stand 276 support and engage the pipe 222.

It will thus be appreciated that rotation of the pipe 222 causes rotation of the inner die part 206, whilst rotation of the pipe 246 causes rotation of the outer die part 200. The speed and direction of rotation of these parts can be selected as desired to produce co-rotation of the inner and outer die parts 206 and 200 at different speeds or counter-rotation of these parts. If desired, the drive to either of these parts can be prevented, or merely omitted completely, if it is sufficient merely to rotate one of the parts relative to the other which is kept fixed.

In use, air is supplied under pressure through the tube 222 to issue from the injectors 208. At the same time, chocolate having a clay-like consistency is passed under pressure through pipe 256 and manifold 252 into the space 258 between the pipes 246 and 222. This chocolate passes through the sleeve 236 around the collar 220 while relative rotation between the inner and outer die parts 206 and 200 takes place. The chocolate passes through the cage 212 so as to fill the space around the tubes 216 before passing through the apertured support plate 210. Because of the provision of the injectors 208 and the aperture 202 with recesses 204, a hollow chocolate member is extruded from the die. The hollow chocolate member has a continuous circular outer surface with spaced helical ribs thereon produced by the recesses 204. Within the hollow member, there are provided radially-extending flanges as a result of the spacing between the injectors 208 and a small central solid core in the extruded member is produced as a result of the termination of the inner ends of the injectors 208 on a pitch circle outwardly of the axis of the aperture 202. The longitudinal passages in the extruded member correspond in cross-sectional shape substantially to the segmental shapes of the injectors 208.

Relative rotation between the outer die part 200 and the inner die part 206 serves to mitigagte the tendency of the product to swerve to one side.

In a particular embodiment, the inner die part 206 is not rotated, the outer die part 200 is rotated at a speed of 20 revolutions per minute, while the rate of extrusion of chocolate is 2.65 meters per minute. The relatively high speed of rotation of the outer die part 200 compared to the extrusion speed enables the swerving tendency to be reduced to a tolerable amount so that a linear extrusion is produced.

In the event of a blockage occurring within the assembly, the sub-assembly of outer die part 200 and sleeve 236 can be quickly removed by loosening the grub screw 248 and unscrewing the sleeve 236 from the pipe 246. The sleeve 236 can then be withdrawn axially of the assembly so as to leave the inner die part 206 and cage 212 fully exposed for ease of cleaning. Additionally, the sub-assembly of inner die part 206, cage 212 and manifold 214 can be easily removed from the collar 220 merely by rotating and pulling the manifold 214 so that the slots 226 are disengaged from the ends of the pin 228. The O-ring seal 232 is relatively large and is resilient so as to perform the function of a securing spring which is usually provided in a bayonet-type connection.

It is also within the scope of the present invention to supply a fluid, e.g. a liquid or paste, through the injectors 17 or 208 which is intended to remain in the extruded member when the latter is sold. For example, the lengths of extruded hollow chocolate tube may be provided with a liquid, paste or relatively solid, edible filling. The ends of the tube will be sealed in the event that a filling is used which is likely to run out of the tube.

While in the above described embodiment the material being extruded is chocolate, it is to be appreciated that the present invention is applicable to any material which is difficult to extrude in a hollow form without collapsing of the walls. In this respect, difficulties can arise particularly when the material after setting is relatively rigid and/or fragile since this effectively precludes the possibility of extruding vertically to maintain shape and then passing around a drum after setting.

I claim:

1. An extrusion die for extruding material to form an extruded product having a plurality of longitudinally extending spaced passages distributed around a core of extruded material in the product, the die comprising:
   an outer die part;
   an aperture through said outer die part having a downstream end relative to the direction of flow of material being extruded;
   an inner die part located within said aperture defining an extrusion orifice, so that only said inner die part and extrusion orifice are within said aperture adjacent said downstream end thereof;
   means for effecting relative rotation between said inner and outer die parts;
   supply passage means for supplying material to be extruded, said supply passage means communicating with said extrusion orifice and extending in the direction of extrusion;
   said inner die part comprising,
   a plurality of injectors disposed in relative spaced relationship with respect to each other within and spaced inwardly of said outer die part defining spaces therebetween extending in the direction of extrusion, said injectors being spaced apart about a core-forming space and each having a downstream end,
   common support means supporting said injectors in said spaced relationship within said outer die part, said common support means being spaced upstream of said downstream ends of said injectors relative to the direction of flow of material being extruded in use,
   a peripheral surface on said common support means sealingly and rotatably engaging said outer die part,
   holes defined in said common support means, said holes extending in the direction of extrusion and providing communication between said supply passage means and the spaces defined between said injectors and between said injectors and said outer die part in said extrusion orifice;
   each injector having,
   a cross-sectional shape at the downstream end thereof corresponding to that desired for a respective one of the longitudinally extending passages in the extruded product,
   a fluid outlet at said downstream end of each injector, and
   a fluid passage therein leading to said fluid outlet for supplying fluid therethrough to the respective longitudinally extending passage in the extruded product;
   fluid supply means comprising a fluid supply manifold disposed in said supply passage means in spaced relationship with respect to said inner die part and said common support means, and a plurality of fluid feed pipes connecting each fluid passage to said fluid supply manifold; and a support cage surrounding said fluid feed pipes, said support cage extending from said fluid supply manifold within said supply passage means to said common support means so that material to be extruded passes along said supply passage means, through said support cage and around and between said fluid feed pipes through said holes in said common support means and said spaces defined between said injectors, and between said injectors and said outer die part in said extrusion orifice.

2. An extrusion die as claimed in claim 1 wherein: said aperture has a circular cross-sectional configuration.

3. An extrusion die as claimed in claim 10 wherein: said direction of extrusion is substantially horizontal.

4. An extrusion die as claimed in claim 1 wherein:
said supply passage means comprises a supply pipe for extrudable material;
a sleeve is provided having one end connected to said outer die part and an opposite end detachably engaged with said supply pipe; and
said cage extends axially in said sleeve.

5. An extrusion die as claimed in claim 4 and further comprising:
a fluid supply pipe for supplying fluid to said fluid supply manifold; and
a quick release connection means for connecting said fluid supply pipe to said fluid supply manifold.

6. An extrusion die as claimed in claim 5 wherein: said direction of extrusion is substantially horizontal.

* * * * *